(12) United States Patent
Prabhu et al.

(10) Patent No.: US 12,033,135 B2
(45) Date of Patent: *Jul. 9, 2024

(54) ELECTRONIC WALLET FUND TRANSFER SYSTEM

(71) Applicant: PAYPAL, INC., San Jose, CA (US)

(72) Inventors: Nitin Prabhu, Fremont, CA (US); Jonathan Miel, San Jose, CA (US); Fei Pan, San Jose, CA (US); Rolf Jochen Haag, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/474,041

(22) Filed: Sep. 13, 2021

(65) Prior Publication Data

US 2022/0012722 A1    Jan. 13, 2022

Related U.S. Application Data

(63) Continuation of application No. 16/438,186, filed on Jun. 11, 2019, now Pat. No. 11,120,429, which is a
(Continued)

(51) Int. Cl.
*G06Q 20/36* (2012.01)
*G06Q 20/02* (2012.01)
(Continued)

(52) U.S. Cl.
CPC .......... *G06Q 20/36* (2013.01); *G06Q 20/023* (2013.01); *G06Q 20/10* (2013.01); *G06Q 20/3221* (2013.01); *G06Q 20/3674* (2013.01)

(58) Field of Classification Search
None
See application file for complete search history.

(56) References Cited

U.S. PATENT DOCUMENTS 6,805,287 B2    10/2004  Bishop et al.
7,644,037 B1    1/2010   Ostrovsky
(Continued)

FOREIGN PATENT DOCUMENTS

CA      2832204 A1    11/2012
JP      2007042080  *  2/2007  ............. G06Q 20/10
(Continued)

OTHER PUBLICATIONS

"Mobile Wallet Technologies: Global Markets" PR Newswire dated Apr. 15, 2013 (Year: 2013).*
(Continued)

*Primary Examiner* — Abhishek Vyas
*Assistant Examiner* — Blane A Lickteig
(74) *Attorney, Agent, or Firm* — Haynes and Boone, LLP

(57) ABSTRACT

Systems and methods for transferring funds to an user account include a payment service provider device receiving a request for fund transfer information for an user account from a payer device that is associated with a payer. The payment service provider device then provides a routing number that is associated with the payment service provider and a virtual account number that is associated with the user account to the payer device. The payment service provider device then receives information from a financial institution about a funds transfer to a payment service provider account that is provided to a payment service provider by the financial institution. The information about the funds transfer includes a funding amount and the virtual account number, and the payment service provider device allocates the funding amount to the user account using the virtual account number.

20 Claims, 9 Drawing Sheets

Related U.S. Application Data continuation of application No. 14/194,360, filed on Feb. 28, 2014, now Pat. No. 10,366,386.

(60) Provisional application No. 61/877,187, filed on Sep. 12, 2013.

(51) Int. Cl.
*G06Q 20/10* (2012.01)
*G06Q 20/32* (2012.01)

(56) References Cited

U.S. PATENT DOCUMENTS

| | | | |
|---|---|---|---|
| 8,352,370 | B1 | 1/2013 | White et al. |
| 8,639,621 | B1* | 1/2014 | Ellis .................. G06Q 30/0623 |
| | | | 705/41 |
| 2005/0269401 | A1 | 12/2005 | Spitzer et al. |
| 2006/0116961 | A1 | 6/2006 | Kopko |
| 2007/0125838 | A1 | 6/2007 | Law et al. |
| 2008/0140531 | A1 | 6/2008 | Diveley et al. |
| 2009/0089176 | A1 | 4/2009 | McCabe |
| 2009/0313166 | A1 | 12/2009 | McNab |
| 2010/0205095 | A1* | 8/2010 | Ostrovsky ............. G06Q 40/12 |
| | | | 705/44 |
| 2010/0262544 | A1 | 10/2010 | Levchin et al. |
| 2011/0035320 | A1 | 2/2011 | Perlman et al. |
| 2011/0093386 | A1 | 4/2011 | Phillips et al. |
| 2011/0112954 | A1 | 5/2011 | Bruesewitz et al. |
| 2011/0112964 | A1 | 5/2011 | Berntsen et al. |
| 2011/0238553 | A1* | 9/2011 | Raj ...................... G06Q 20/405 |
| | | | 705/37 |
| 2012/0130731 | A1 | 5/2012 | Canetto |
| 2012/0209762 | A1* | 8/2012 | Metaireau ............. G06Q 20/10 |
| | | | 705/39 |
| 2012/0284175 | A1* | 11/2012 | Wilson .................. G06Q 20/10 |
| | | | 705/39 |
| 2013/0006810 | A1 | 1/2013 | Elias |
| 2013/0060689 | A1* | 3/2013 | Oskolkov ............. G06Q 20/10 |
| | | | 705/42 |
| 2013/0218769 | A1* | 8/2013 | Pourfallah ............ G06Q 20/10 |
| | | | 705/44 |
| 2013/0339233 | A1 | 12/2013 | Lee et al. |
| 2014/0081843 | A1 | 3/2014 | McKernan et al. |
| 2014/0095383 | A1* | 4/2014 | Rao ...................... G06Q 20/385 |
| | | | 705/43 |
| 2014/0101034 | A1 | 4/2014 | Tanner et al. |
| 2014/0207668 | A1* | 7/2014 | Hermansen ........... G06Q 20/36 |
| | | | 705/41 |
| 2014/0222671 | A1 | 8/2014 | Elias |

FOREIGN PATENT DOCUMENTS

| | | | |
|---|---|---|---|
| JP | 2007042080 | A * | 2/2007 |
| JP | 2007042080 | A | 2/2007 |
| JP | 2008200648 | A | 9/2008 |
| JP | 2009080605 | A | 4/2009 |
| JP | 2010232558 | A | 10/2010 |
| JP | 2011502311 | A | 1/2011 |

OTHER PUBLICATIONS

"Mobile Wallet Technologies: Global Markets", PR Newswire, Apr. 15, 2013. (Year: 2013).*
Communication pursuant to Article 94(3) EPC for European Application No. 14843937.5 dated Aug. 16, 2022, 8 pages.
International Preliminary Report on Patentability for Application No. PCT/US2014/053282 dated Mar. 24, 2016, 8 pages.
Extended European Search Report for European Application No. 14843937.5 dated May 9, 2017, 7 pages.
International Search Report and Written Opinion for International Application No. PCT/US2014/053282 dated Dec. 17, 2014, 9 pages.
Proquest., "Mobile Wallet Technologies: Global Markets," PR Newswire, Apr. 15, 2013, 13 pages.
Written Opinion for Singapore Patent Application No. 11201510298S dated Mar. 30, 2016, 4 pages.

* cited by examiner

ELECTRONIC WALLET FUND TRANSFER SYSTEM

CROSS-REFERENCE

This application is a Continuation Application of U.S. Utility patent application Ser. No. 16/438,186, filed Jun. 11, 2019, which is a continuation application of U.S. Utility patent application Ser. No. 14/194,360, filed on Feb. 28, 2014, issued on Jul. 30, 2019 as U.S. Pat. No. 10,366,386, which claims priority to U.S. Provisional Patent Application Ser. No. 61/877,187, filed on Sep. 12, 2013, the entire disclosures of which are hereby incorporated herein by reference in their entirety.

BACKGROUND

Field of the Invention

The present disclosure generally relates to online and/or mobile payments and more particularly to transferring funds to an electronic wallet used to make online and/or mobile payments.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, CA Such payment service providers can make transactions easier and safer for the parties involved. Purchasing with the assistance of a payment service provider from the convenience of virtually anywhere using a mobile device is one main reason why on-line and mobile purchases are growing very quickly.

Payment service providers sometimes provide electronic "wallets" to their users that include user payment accounts that are provided by the payment service provider and that allow the user to make payments for purchases and/or other expenses. In addition, a user may link their financial accounts such as, for example, checking accounts, savings accounts, credit accounts, and/or a variety of other financial account known in the art, to their electronic wallet in order to fund their user payment account for making purchases. Furthermore, different users of the payment service provider may transfer funds between their respective electronic wallets. As such, electronic wallets provided by the payment service provider may be funded by the users of those electronic wallets using their financial account, or through payments or other fund transfers from other users with electronic wallets. However, the funding of such electronic wallets via entities without user payment accounts provided by the payment service provider can raise a number of issues.

For example, if a user wishes to fund their electronic wallet via a paycheck from their employer that does not have a user payment account provided by the payment service provider, that user may (1) receive a physical check from their employer, deposit that physical check in their bank account, and then transfer the deposited funds from their bank account to their electronic wallet, or (2) instruct their employer to deposit their paycheck directly into their bank account and then transfer the deposited funds from their bank account to their electronic wallet. Such conventional electronic wallet fund transfers require that the user have a bank account, require that the user provide their bank account information to the payer, and can be time consuming and costly for both the user and the payer.

Thus, there is a need for an improved electronic wallet fund transfer system.

Figure 1:
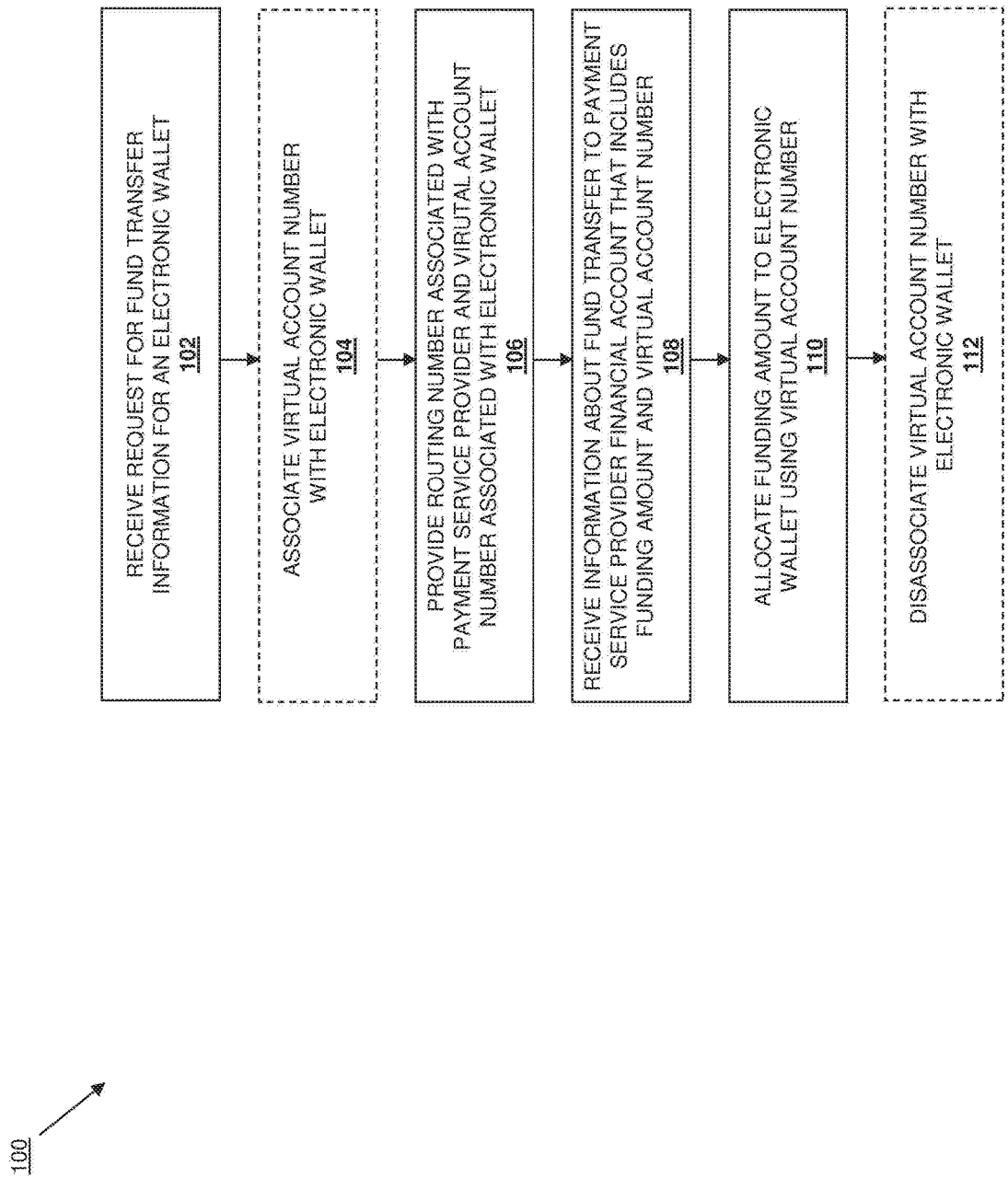
FIG. 1 is a flow chart illustrating an embodiment of a method for transferring funds to an electronic wallet.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for transferring funds to an electronic wallet. In several embodiments, the systems and methods described herein provide for the transfer of funds by a payer to an electronic wallet of a user via the Automated Clearing House (ACH) network for financial transactions using an ACH routing number that is globally unique to a payment service provider that provides the electronic wallet to the user, and using a virtual account number that is associated with the electronic wallet provided to the user within the payment service provider. The payer may then use the ACH routing number and the virtual account number to transfer funds to a payment service provider financial account that is provided by a financial institution such as, for example, a bank. When the financial institution informs the payment service provider of that fund transfer, the payment service provider may then use the virtual account number to allocate the funding amount of that fund transfer to the electronic wallet provided to the user. Using such systems and methods, the user does not need to provide any personal financial account information to the payer (e.g., a bank account number) and, in fact, does not need to have any financial account separate from the electronic wallet. Furthermore, in embodiments that include the ACH routing number that is globally unique to the payment service provider, payers may use existing ACH network infrastructure for fund transfers to electronic wallets.

Referring now to FIGS. 1, 2, 3, 4, and 5, an embodiment of a method 100 for transferring funds to an electronic wallet is illustrated. In the embodiments illustrated and discussed below, a payer is attempting to transfer funds to an electronic wallet that is provided to a user by a payment service provider such as, for example, PayPal Inc. of San Jose, CA However, electronic wallets may be provided to users by any of a variety of entities (referred to henceforth as "system providers"), and as such, the payment service provider discussed below may be replaced with any of a variety of system providers while remaining within the scope of the present disclosure.

In an embodiment, the electronic wallet provided to the user may include a user payment account provided by a payment service provider or system provider. For example, a payment service provider may provider a user payment account for the user that allows the user to link financial accounts (e.g., banking accounts such as checking accounts, savings accounts, and/or other banking accounts known in the art; credit accounts; brokerage accounts; and/or a variety of other financial accounts known in the art) to their user payment account in order to use those financial accounts to fund the user payment account (e.g., via transfers of funds from the financial accounts to the user payment account). As such, the user is provided an electronic wallet that the user may fund (via the financial accounts) and make purchases with (via the user payment account) without exposing their financial accounts to any payee. However, as discussed further herein, the electronic wallet of the present disclosure may eliminate the need to link any financial accounts to the electronic wallet for funding the user payment account, or may eliminate the need to link particular types of financial accounts to the electronic wallet. For example, many users may not have banking accounts (e.g., checking accounts, savings accounts, etc.) with a banking institution, and the systems and methods of the present disclosure will enable those users to fund their electronic wallets using fund transfers from any of a variety of payers.

Figure 2:
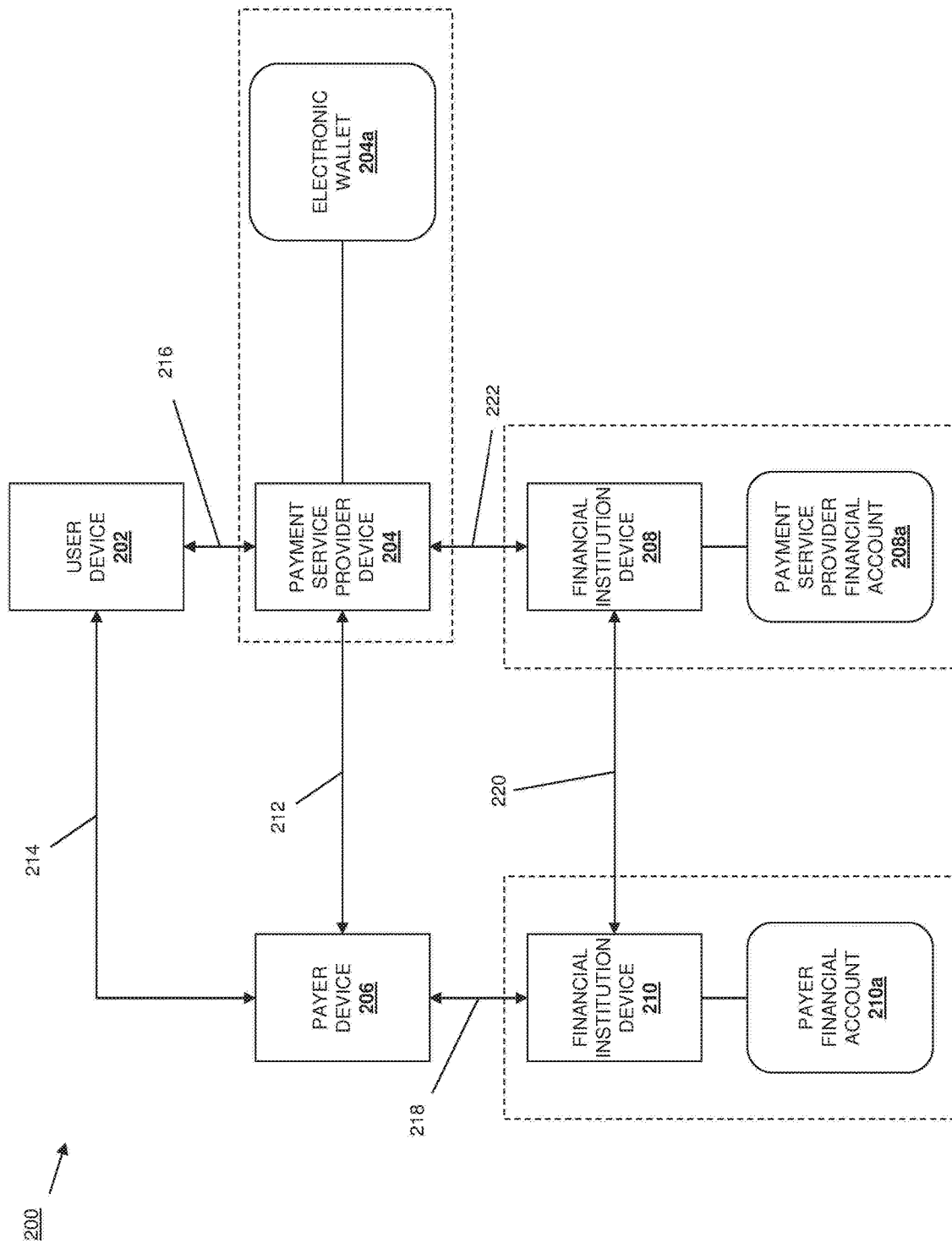
FIG. 2 is a schematic view illustrating an embodiment of an electronic wallet fund transfer system.

Referring to FIG. 2, an embodiment of an electronic wallet fund transfer system 200 is illustrated that includes a user device 202 that may communicate with a payment service provider device 204 that is operated by a payment service provider and a payer device 206 that is operated by a payer. The payment service provider device 204 provides an electronic wallet 204a for a user of the user device 202, and the user device 202 and electronic wallet 204a may be linked via a user payment account, a user device identifier (e.g., a phone number), and/or a variety of other device/electronic wallet linking methods known in the art. The payment service provider device 204 may communicate with a financial institution device 208 that is operated by a financial institution (e.g., a banking institution in the embodiments discussed below) that provides a payment service provider financial account 208a (e.g., a bank account in the embodiments discussed below) for the payment service provider. The payer device 206 may communicate with a financial institution device 210 that is operated by a financial institution (e.g., a banking institution in the embodiments discussed below) and that provides a payer financial account 210a (e.g., a bank account in the embodiments discussed below) for the payer. While the financial institution devices 210 and 208 are discussed below as being operated by different financial institutions that provide the payer financial account 210a and the payment service provider financial account 208a, respectively, one of skill in the art in possession of the present disclosure will recognize that a single financial institution may provider both the payer financial account 210a and the payment service provider financial account 208a while remaining within the scope of the present disclosure.

The payer that operates the payer device 206 in the embodiments discussed below may be any of a variety of entities known in the art that may transfer funds to users. For example, the payer may be an employer of the user that transfers paychecks to the user, an insurance company that transfers an insurance payout to the user, a government entity that transfers a tax refund to the user, etc. Furthermore, while a few examples of payers have been provided, any payer wishing to transfer funds to an electronic wallet of a user will fall within the scope of the present disclosure. Further still, in embodiments where the ACH]network is used to transfer funds to an electronic wallet of a user, the systems and methods described herein will allow any payer that already incorporates existing ACH network infrastructure to use that infrastructure to quickly and easily transfer funds to electronic wallets without any need to modify or supplement that infrastructure. As such, embodiments of the present disclosure will be useful and inexpensive to implement for any ACH network-enabled payer known in the art.

The method 100 begins at block 102 where a request is received from a payer for fund transfer information for an electronic wallet of a user. In an embodiment of block 102, the payment service provider device 204 communicates with the payer device 206 over a network (as illustrated by communication 212 in FIG. 2) to receive a request for fund transfer information for the electronic wallet 204a that is provider to a user of the user device 202. An example of how the request at block 102 may be generated is provided below with reference to FIGS. 3a, 3b, and 3c, but one of skill in the art in possession of the present disclosure will recognize that the request by block 102 may be generated in a variety of other manners known in the art while remaining within the scope of the present disclosure. For example, while the request generated according to FIGS. 3a, 3b, and 3c involve the user of the user device 202, a previously authorized payer may send the request at block 102 without interaction with the user.

Figure 3A:
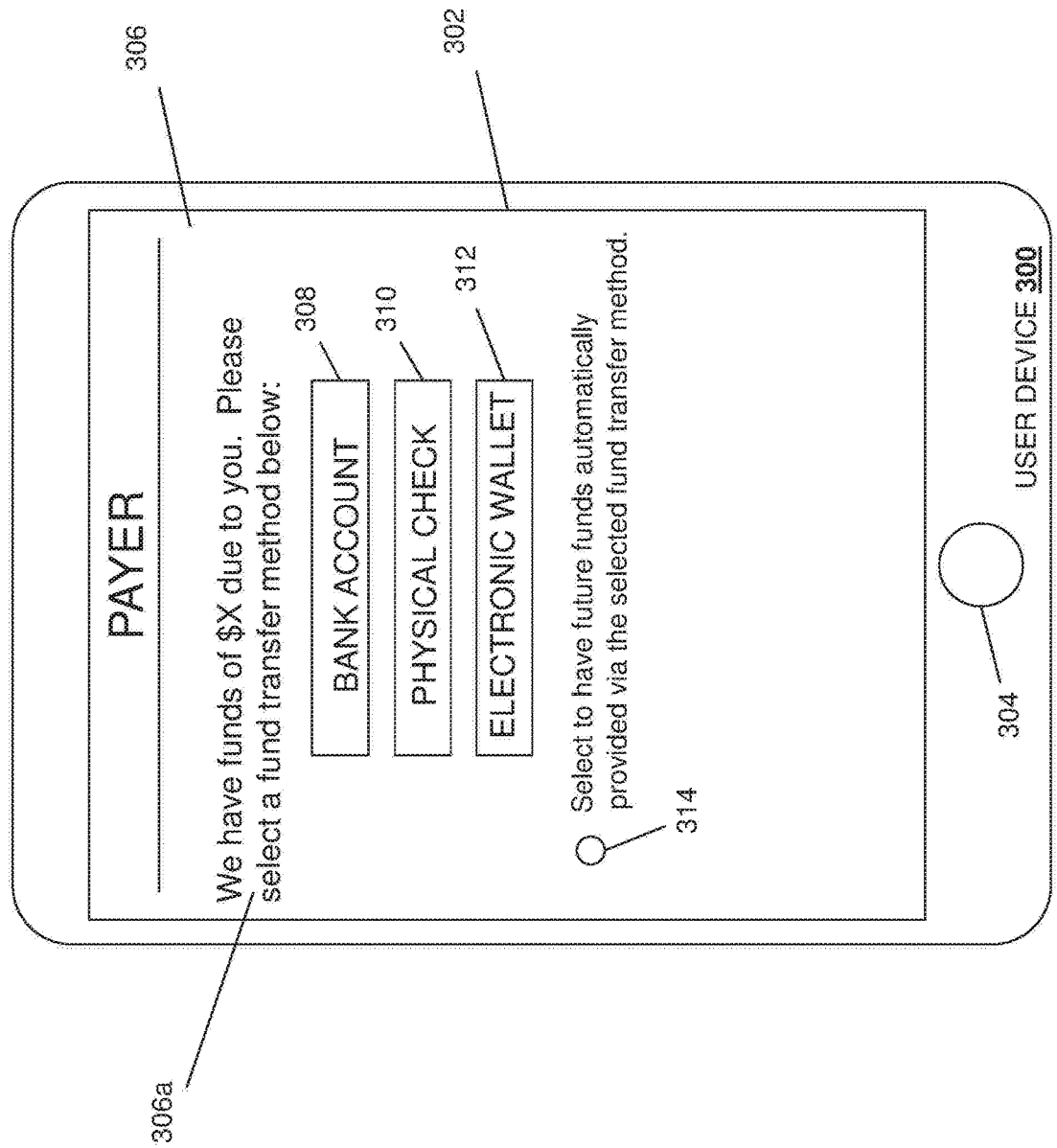
FIG. 3a is a screen shot illustrating an embodiment of a fund transfer method selection screen.

Referring to FIG. 3a, an embodiment of a user device 300 that includes a display 302 and an input button 304 is illustrated. In an embodiment, the user device 300 may be the user device 202 illustrated in FIG. 2. In the illustrated embodiment, the display 302 on the user device 300 is displaying a fund transfer method selection screen 306 that may be provided, for example, through a payer website, through a payer application, and/or in a variety of manners known in the art. For example, the user device 202/300 may communicate with the payer device 206 over a network (as illustrated by communication 214 in FIG. 2) to receive the fund transfer method selection screen 306 for display on the user device 202.

In a specific example, the payer may be an employer of the user, and the fund transfer method selection screen 306 may allow the user to select a method for transferring funds in a paycheck from the employer/payer. In another specific example, the payer may be an insurance company that the user is dealing with, and the fund transfer method selection screen 306 may allow the user to select a method for transferring funds from an insurance payout from the insurance company/payer. In yet another specific embodiment, the payer may be a government entity that the user is dealing with, and the fund transfer method selection screen 306 may allow the user to select a method for transferring funds from a tax refund from the government entity/payer. While the use of a website or application to select a fund transfer method is illustrated and described, one of skill in the art will recognize that the selection of a fund transfer method by a user may be communicated to a payer over a phone, through conventional mail, in-person, and/or in a variety of other manners known in the art while remaining within the scope of the present disclosure.

The fund transfer method selection screen 306 includes a communication 306a that informs the user that the payer has funds for the user, and requests a selection of a fund transfer method for use in transferring those funds to the user. A plurality of fund transfer method selectors may be provided on the fund transfer method selection screen 306 including, for example, a bank account fund transfer method selector 308, a physical check fund transfer method selector 310, and electronic wallet fund transfer method selector 312. While not discussed in detail, the bank account fund transfer method selector 308 may allow the user to select a conventional bank account fund transfer method in which the user provides banking account information (e.g., a routing number for a banking institution of the user, a bank account number for a bank account of the user that is provided by the banking institution, etc.) to the payer such that the payer may transfer the funds to the bank account of the user. Similarly, the physical check fund transfer method selector 310 may allow the user to select a conventional physical check fund transfer method in which the user is provided a physical check from the payer, and the user must deposit that physical check in a bank account of the user such that the funds may be transferred to the bank account of the user. As discussed above, each of these fund transfer methods is associated with several deficiencies. Furthermore, while a few conventional fund transfer methods have been discussed, any of a variety of conventional fund transfer methods may be provided for selection by the user on the fund transfer method selection screen 306.

As discussed in detail below, the electronic wallet fund transfer method selector 312 allows the user to instruct the payer to provide the payment to the electronic wallet 204a that is provided to the user by the payment service provider 204. The fund transfer method selection screen 306 also includes an automatic fund transfer selector 314 that the user may select to have the selected fund transfer method be utilized for future fund transfers to the user (e.g., future paychecks from an employer). In some embodiments, the selection of the automatic fund transfer selector 314 may result in subsequent fund transfers from the payer to the user via the method 100 without the need for any input from or interaction with the user.

Figure 3B:
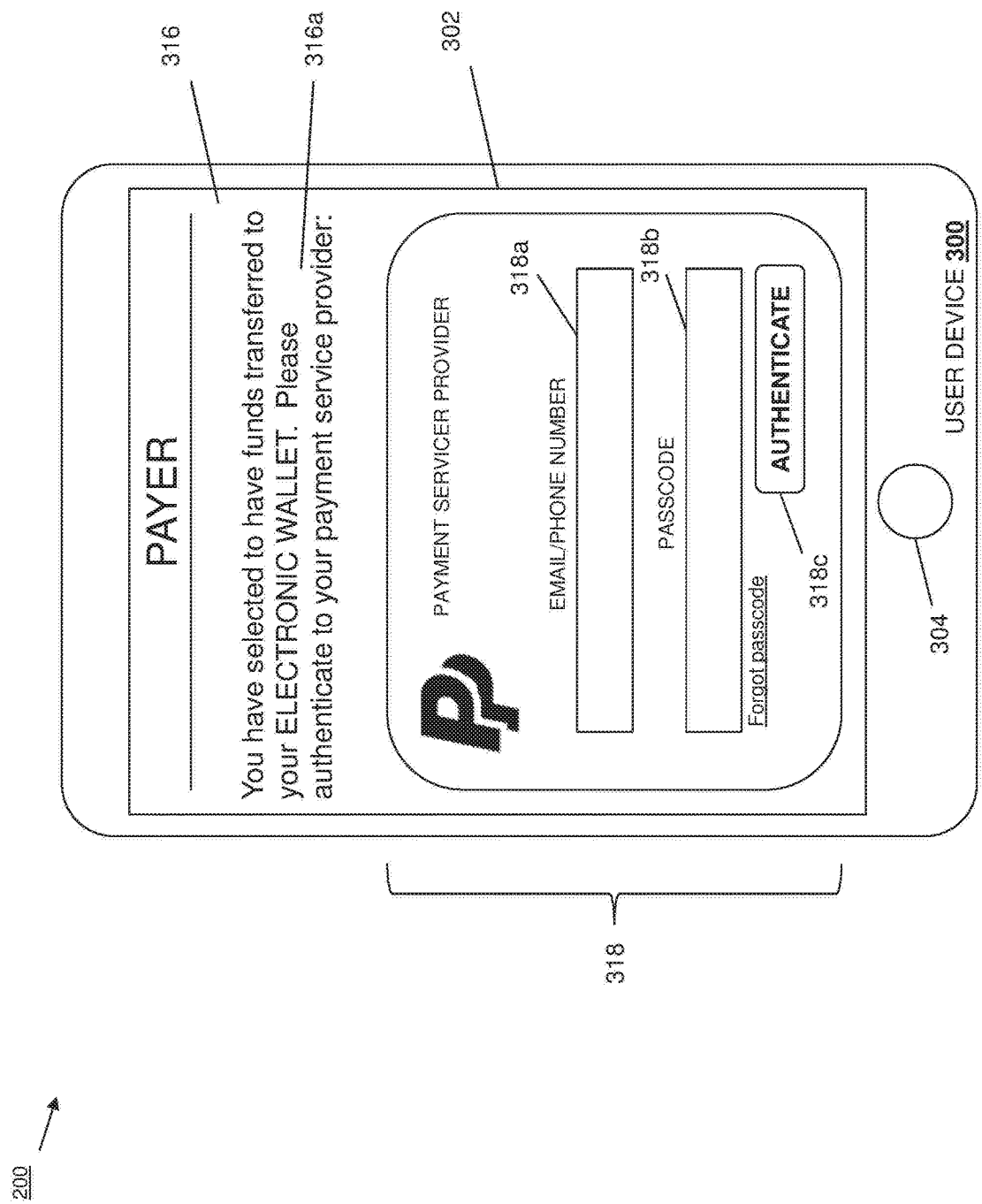
FIG. 3b is a screen shot illustrating an embodiment of an electronic wallet authentication screen.

Referring now to FIG. 3b, the display 302 on the user device 300 is illustrated displaying an electronic wallet authentication screen 316 that may be provided in response to the user selecting the electronic wallet fund transfer method selector 312 on the fund transfer method selection screen 306. The electronic wallet authentication screen 316 includes a communication 316a that informs the user that they have selected to have funds transferred to the electronic wallet 204a, and requests that the user authenticate to the payment service provider that provides the electronic wallet 204a to the user. The electronic wallet authentication screen 316 also includes an authentication section 318 that includes a user identifier input 318a, a passcode input 318b, and an authenticate button 318c. As is known in the art, the user may provide a user identifier (e.g., a phone number, an email address, a username, etc.) in the user identifier input 318a, a passcode in the passcode input 318b, and then select the authenticate button 318c in order to send authentication credentials (i.e., the user identifier and passcode) for authentication.

In some embodiments, the payer device 206 communicates with the user device 202 over a network (as illustrated by communication 214 in FIG. 2) to provide the authentication section 318 and such that the payer may retrieve authentication credentials from the user, and the payer device 206 may then communicate with the payment service provider device 204 over a network (as illustrated by communication 212 in FIG. 2) to provide those authentication credentials to the payment service provider. In such embodiments, the communications 212 may include an indication of the selection by the user of the electronic wallet fund transfer method, along with the authentication credentials and any other information needed to show that the user wishes to have funds transferred from the payer to the electronic wallet 204a provided by the payment service provider.

In other embodiments, the payment service provider device 204 communicates with the user device 202 over a network (as illustrated by communication 216 in FIG. 2) to provide the authentication section 318 and retrieve authentication credentials directly from the user through the user device 202/300. For example, in response to the user selecting the electronic wallet fund transfer method selector 312, the payer device 206 may send the payment service provider device 204 any information needed to show that the user wishes to have funds transferred from the payer to the electronic wallet 204a provided by the payment service provider. In response, the payment service provider device 204 operates to provide the authentication section 318 on the electronic wallet authentication screen 316. In some embodiments, the payment service provider device 204 may provide the authentication section 318 through a website of the payer as part of the electronic wallet authentication screen 316 provided by the payer device 206 (e.g., the payer device 206 may provide a "window" in the electronic wallet authentication screen 316 that allows the authentication section 318 to be provided by the payment service provider device 204 and that prevents the payer device 206 from accessing any authentication credentials provided in the authentication section 318). In other embodiments, the payment service provider device 204 may provide the electronic wallet authentication screen 316 that includes the authentication section 318 (e.g., following the user selection of the electronic wallet fund transfer method selector 312, the user may be "redirected" to the electronic wallet authentication screen 316 provided to the user device 202/300 by the payment service provider device 204 via the communications 216.) While a few examples have been provided, the authentication of the user may be performed in a variety of manners while remaining within the scope of the present disclosure.

Figure 3C:
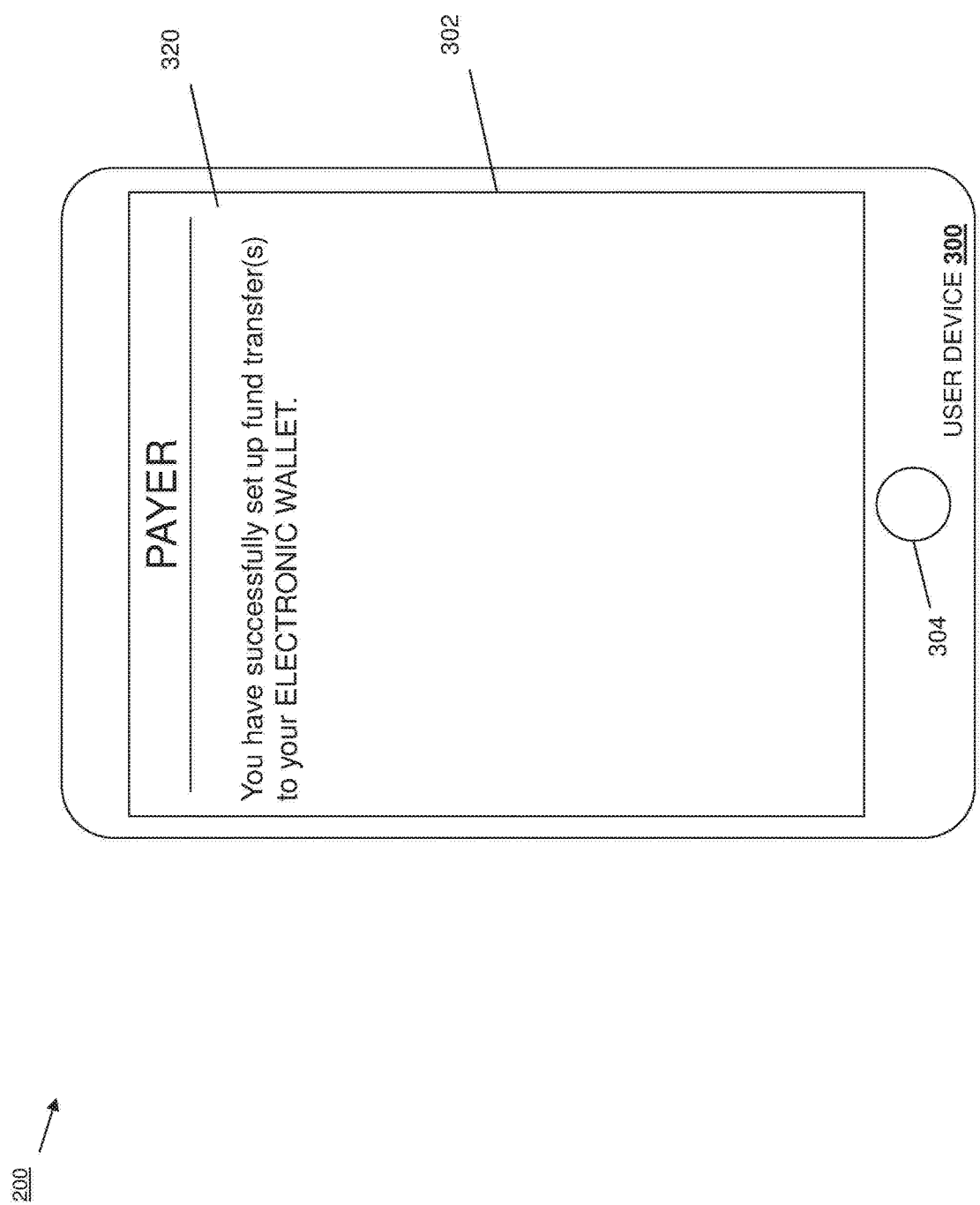
FIG. 3c is a screen shot illustrating an embodiment of a fund transfer method confirmation screen.

Referring now to FIG. 3c, the display 302 on the user device 300 is illustrated displaying a fund transfer method confirmation screen 320 in response to the user being authenticated by the payment service provider device 204 following authentication of authentication credentials that the user provided in the authentication section 318 of the electronic wallet authentication screen 316. The fund transfer method confirmation screen 320 includes a communication 320a that informs the user that they have successfully set up fund transfer(s) from the payer to the electronic wallet 204a. In an embodiment, in response to the payment service provider device 204 authenticating the authentication credentials of the user, the payment service provider device 204 may provide the payer device 206 an authorization code over a network (e.g., via the communications 212) that may be used to confirm that an authenticated user has authorized the payer to transfer funds to the electronic wallet 204a. In embodiments where the user was redirected to the electronic wallet authentication screen 316 provided by the payment service provider device 204, the user may be directed back to the fund transfer method confirmation screen 320 that is provided by the payer device 206 to the user device 202/300. However, in other embodiments, the payment service provider device 204 may provide fund transfer method confirmation screen 320 to the user device 202/300.

FIGS. 3a, 3b, and 3c, and the accompanying discussion, provide an example of communications between a user, a payer, and a payment service provider. The communications allow the user to elect to have funds transferred from the payer to their electronic wallet provided by the payment service provider without having to move through any other financial accounts belonging to the user, discussed in further detail below. Using the teachings referenced by FIGS. 3a, 3b, and 3c, any payer may provide the option for a user to have funds transferred to their electronic wallets, and those users may select that option to receive funds without having financial accounts (e.g., a bank account) or exposing any financial account information (e.g., bank account information) to the payer. Rather, the user may simply select to have the payer transfer funds to an electronic wallet provided by a payment service provider, and upon authentication of the user with the payment service provider, the payer and the payment service provider will operate to move those funds to the electronic wallet without any further input from the user or need for any activity in (or even the existence of) financial accounts belonging to that user.

Thus, at block 102 of the method 100, the payer device 206 may send a request over the network for fund transfer information for the electronic wallet 204a to the payment service provider device 204 (e.g., via the communications 212). In some embodiments, multiple devices in the payment service provider device 204 may be used to provide the payment-service-provider-side portion of the electronic wallet fund transfer system 200. For example, authorization server(s) may be included in the payment service provider device 204 for ensuring that payers are authorized to transfer funds to electronic wallets, and fund transfer information server(s) may be included in the payment service provider device 204 for generating and/or providing fund transfer information to payers for transferring funds to electronic wallets, discussed in further detail below.

In some embodiments of block 102, the payer device 206 may have provided the payer an authorization code, which as discussed above may be used to confirm that an authenticated user has authorized the payer to transfer funds to the electronic wallet 204a. In such embodiments, the payer device 206 may provider the authorization code to the authorization server(s) in the payment service provider device 204 as some or all of the request for fund transfer information for the electronic wallet 204a. In response to receiving the authorization code, the authorization server(s) may validate the authorization code and provide token(s) for accessing the fund transfer information server(s). For example, in response to receiving the authorization code from the payer device 206, the authorization server(s) may provide a JavaScript Object Notation (JSON) that includes an access token, a refresh token, an identification token, and/or other tokens known in the art to the payer device 206.

In other embodiments of block 102, the payment service provider device 204 may receive the request for the fund transfer information for the electronic wallet 204a from the payer device 206 that includes a user identifier (e.g., a username), an electronic wallet identifier (e.g., a user payment account number), a user device identifier (e.g., a phone number), and/or a variety of other user and/or electronic wallet identifiers known in the art and, in response, the payment service provider device 204 may determine whether the payer that provided the request has been authorized to retrieve fund transfer information for the electronic wallet 204a of the user. While a few examples have been provided, the payment service provider may determine that the payer is authorized to retrieve fund transfer information for a user's electronic wallet using a variety of other methods that will fall within the scope of the present disclosure.

The method 100 may then proceed to optional block 104 where a virtual account number is associated with the electronic wallet 204a. Block 104 of the method 100 is optional in that the electronic wallet 204a may have previously been associated with a virtual account number (e.g., in response to a prior fund transfer to the electronic wallet 204a, upon creation of the electronic wallet 204a, etc.), and thus will not need to be associated with a virtual account number during the method 100 (or a current iteration of the method 100). In embodiments where the payer device 206 was provided token(s) for accessing the fund transfer information server(s), the payer device 206 may provide the access token(s) to the fund transfer information server(s) and, in response to receiving valid access token(s), the fund transfer information server(s) may operate to generate and/or associate the virtual account number with the electronic wallet 204a as discussed below.

In some embodiments, the payment service provider device 204 may generate a virtual account number and associate that virtual account number with the electronic wallet 204a and/or the user payment account associated with that electronic wallet 204a in a database in the payment service provider device 204. In other embodiments, the payment service provider device 204 may not generate the virtual account number, but instead may select a virtual account number that is stored in a database, and associate that virtual account number with the electronic wallet 204a in that database or another database coupled to the payment service provider device 204. For example, each electronic wallet and/or user payment account provided by the payment service provider may be associated with a unique identifier in the payment service provider device 204, and at optional block 104, the association of the virtual account number with the electronic wallet 204a may include the association of the virtual account number with the unique identifier for the electronic wallet 204a and/or user payment account associated the electronic wallet 204a in a database. While a few examples have been provided, one of skill in the art in possession of the present disclosure will recognize that virtual account numbers may be generated, selected, and/or associated with electronic wallets in a variety of manners while remaining within the scope of the present disclosure.

The method 100 then proceeds to block 106 where fund transfer information for the electronic wallet 204a is provided to the payer. In the illustrated embodiment, a routing number that is associated with the payment service provider, and the virtual account number that was associated with the electronic wallet 204a, are provided by the payment service provider device 204 over the network to the payer device 206 (e.g., via the communication 212). In embodiments where the fund transfer information server(s) received valid access token(s) from the payer device 206, the fund transfer information server(s) may generate or select the virtual account number, associate that virtual account number with the electronic wallet 204*a* in a database, and send the virtual account number along with the routing number for the payment service provider over the network to the payer device 206. In other embodiments, the determination that the payer is authorized to receive fund transfer information for the electronic wallet 204*a* or user payment account associated with that electronic wallet 204*a* may result in the payment service provider device 204 accessing a database that associates the electronic wallet 204*a* with the virtual account number, retrieving that virtual account number, and providing it to the payer device 206.

In an embodiment, the routing number that is associated with the payment service provider and that is provided at block 106 may be a globally unique identifier that was previously associated with the payment service provider prior to the method 100. For example, the routing number provided at block 106 may be an ACH routing number for use in the ACH network with fund transfers to the payment service provider. As such, a specific example of the ACH routing number associated with the payment service provider may include a nine digit number, with the first four digits identifying the Federal Reserve district where the payment service provider (or their financial institution, discussed below) is located, the next four digits identifying the payment service provider (or a financial account of the payment service provider, discussed below), and the last digit being a confirmation number or check digit. While a specific example of an ACH routing number has been provided, other forms of routing numbers that are globally unique to the payment service provider are envisioned as falling within the scope of the present disclosure, and may include routing numbers that are assigned to the payment service provider during the method 100.

In an embodiment, the virtual account number that is associated with the electronic wallet may be an identifier that is unique to the electronic wallet within the payment service provider (e.g., a virtual account number may only be associated in the database of the payment service provider device 204 with a single electronic wallet or user account associated with that electronic wallet). However, in some embodiments, "joint" wallets (e.g., multiple electronic wallets that are linked, such as the electronic wallets of a husband and wife) may be associated with the same virtual account number such that that virtual account number is unique to those linked wallets. A specific example of the virtual account number provided at block 106 may include a thirteen digit account number, the first four digits of which identify the payment service provider, and at least some of the following digits which are unique to the electronic wallet 204*a* with regard to (or "within") the payment service provider. However, other forms of virtual account numbers (e.g., virtual account numbers that do not include digits that identify the payment service provider) will fall within the scope of the present disclosure.

In response to receiving the routing number and the virtual account number from the payment service provider device 204, the payer device 206 may store the routing number and/or the virtual account number in a database in association with the payment service provider and/or the user. For example, the routing number may be stored in association with the payment service provider in a database, and the virtual account number may be stored in association with the user in a database. In another example, the routing number and virtual account number may be stored in association with the user in a database. In yet another example, only the virtual account number may be associated with the user in a database, as the routing number may be a globally unique number for the payment service provider that does not need to be associated with the user.

One of skill in the art will recognize that embodiments of the present disclosure that use of the nine digit ACH routing number that uniquely and globally associated with the payment service provider, and the thirteen digit virtual account number that is associated with the electronic wallet and unique to electronic wallets provided by the payment service provider will allow for the transfer of funds by the payer device 206 using existing ACH network infrastructure, discussed in further detail below. As such, payers may be more inclined to adopt the electronic wallet fund transfer system, and in fact may welcome the ability to transfer funds to a trusted payment service provider, and/or to users that do not have financial accounts that support ACH network fund transfers.

The payer device 206 may then operate to transfer funds to the electronic wallet 204*a* using the routing number and virtual account number received at block 106. In an embodiment, the payer device 206 may provide the financial institution device 210 the routing number, the virtual account number, and a funding amount to transfer from the payer financial account 210*a* (as well as a payer identifier, payer financial account identifier, and/or other fund transfer information known in the art) over a network (e.g., via the communications 218, illustrated in FIG. 2). In embodiments where the routing number is an ACH routing number, one of skill in the art in possession of the present disclosure will recognize that the payer device 206 may send, and the financial institution device 210 may receive, the fund transfer information from the payer device 206 using existing ACH network infrastructure.

In an embodiment, the routing number that is associated with the payment service provider may provide for any fund transfer to be directed to the payment service provider financial account 208*a* provided by the financial institution that operates the financial institution device 208. For example, an ACH routing number that is associated with the payment service provider may operate within the ACH network to direct fund transfers via to the payment service provider financial account 208*a* provided by the financial institution that operates the financial institution device 208. As such, a specific example of the ACH routing number associated with the payment service provider may include a nine digit number, with the first four digits identifying the Federal Reserve district where the financial institution that operates the financial institution device 208 is located, the next four digits identifying the payment service provider financial account 208*a* provided by the financial institution 208, and the last digit being a confirmation number or check digit.

In an embodiment, the financial institution device 210 may then send the routing number, the virtual account number, the funding amount to be provided from the payer financial account 210*a*, and/or other fund transfer information known in the art, over the network to the financial institution device 208 (e.g., via the communications 220, illustrated in FIG. 2). In embodiments where the routing number is an ACH routing number, one of skill in the art in possession of the present disclosure will recognize that the financial institution device 210 may send, and the financial institution device 208 may receive, the fund transfer information using existing ACH network infrastructure.

Upon receiving the fund transfer information from the financial institution device 210, the financial institution device 208 may use the routing number to determine that the fund transfer from the payer financial account 210*a* through the financial institution device 210 is meant for the payment service provider financial account 208*a* (e.g., due to that routing number being associated with the payment service provider, due to that routing number being associated with the payment service provider financial account 208*a*, etc.) The financial institution device 210 and the financial institution device 208 may then operate to transfer the funding amount from the payer financial account 210*a* to the payment service provider financial account 208*a*. In embodiments where the routing number is an ACH routing number, one of skill in the art in possession of the present disclosure will recognize that the financial institution device 208 and the financial institution device 208 may use existing ACH network infrastructure to transfer the funding amount from the payer financial account 210*a* to the payment service provider financial account 208*a*. Upon transferring the funding amount to the payment service provider financial account 208*a*, the financial institution device 208 may store the identity of the payer, the funding amount, the virtual account number, and/or a variety of other information associated with the funds transfer in a database of the financial institution device 208.

The method 100 then proceeds to block 108 where information is received by the payment service provider about a fund transfer to the payment service provider financial account that includes a funding amount and the virtual account number. In an embodiment, the financial institution device 208 communicates with the payment service provider device 204 over the network (e.g., via the communications 222) to send information about the fund transfer from the payer to the payment service provider financial account 208*a*. That information about the fund transfer may include the funding amount, the virtual account number, the identity of the payer, and/or a variety of other information associated with the funds transfer.

In some embodiments, the financial institution device 208 may store in a database a plurality of fund transfers to the payment service provider financial account 208*a*, and then send information about those fund transfers at block 108 as part of a batch file on a predetermined time schedule. For example, the financial institution device 208 may send batch files that include information about a plurality of fund transfers to the payment service provider financial account 208*a* every 30 minutes, every hour, every day, etc. However, in other embodiments, the financial institution device 208 may send the information about fund transfers to the payment service provider financial account 208*a* as they are received (e.g., on a real-time or near real-time basis such that when a fund transfer to the payment service provider financial account 208*a* is received, that triggers the sending of information about the fund transfer at block 108.)

The method 100 then proceeds to block 110 where the funding amount is allocated to the electronic wallet using the virtual account number. In an embodiment of block 110, the payment service provider device 204 uses the information about the fund transfer received from the financial institution device 208 at block 108 to allocate the funding amount in the fund transfer from the payer to the electronic wallet 204*a* of the user. For example, the information about the fund transfer received at block 108 may include the funding amount provided to the payment service provider financial account 208*a* from the payer financial account 210*a*, along with the virtual account number provided with the fund transfer, and the payment service provider device 204 may reference a database in payment service provider device 204 using the virtual account number to determine the electronic wallet 204*a* (or user payment account associated with that electronic wallet 204*a*) that is associated with that virtual account number. Upon determining the electronic wallet 204*a* using the virtual account number, the payment service provider device 204 may allocate the funding amount transferred to the payment service provider financial account 208*a* to the electronic wallet 204*a* such that the user of that electronic wallet 204*a* has access to those funds.

In some embodiments, the payment service provider may keep funds for electronic wallets in the payment service provider financial account 208*a* provided by their financial institution. In such embodiments, the payment service provider may associate subsets of the funds in the payment service provider financial account 208*a* with different electronic wallets of different users in a database of the payment service provider device 204. As such, the allocation of the funding amount to the electronic wallet 204*a* at block 110 may simply include associating that funding amount with the electronic wallet in a database of the payment service provider device 204, while that funding amount actually remains in the payment service provider financial account 208*a* (either physically or electronically.) In other embodiments, the allocation of the funding amount to the electronic wallet 204*a* at block 110 may include the payment service provider (or system provider) transferring the funding amount from the payment service provider financial account 208*a* provided by their financial institution to an account controlled by the payment service provider (or system provider).

Once the funding amount has been allocated to the electronic wallet 204*a* by the payment service provider device 204, the user of the electronic wallet 204*a* may spend those funds, transfer those funds to financial accounts linked to the electronic wallet 204*a*, transfer those funds to other users with electronic wallets, and/or perform a variety of other electronic wallet actions known in the art. As such, the user may have funds transferred to the electronic wallet 204*a* from the payer in a manner that appears to the user to be a direct fund transfer from the payer to the electronic wallet 204*a*, as the fund transfer does not involve any other financial accounts of the user, nor does it require any actions by the user to receive the funding amount in the electronic wallet and subsequently use that funding amount.

The method 100 may then proceed to optional block 112 where the virtual account number is disassociated with the electronic wallet. In an embodiment, following the allocation of the funding amount at block 110, the payment service provider device 110 may disassociate the virtual account number and the electronic wallet 204*a* in the database. In other embodiments, the disassociation of the virtual account number and the electronic wallet 204*a* may be performed at optional block 112 following a predetermined time period, a predetermined number of fund transfers, a request from the user of the electronic wallet 204*a*, and/or in response to a variety of other disassociation factors. As such, the association of the virtual account number and the electronic wallet 204*a* may be temporary, and a new virtual account number may be associated with the electronic wallet 204*a* for every fund transfer to that electronic wallet 204*a*, after a predetermined number of fund transfers, after a predetermined time period, etc. Furthermore, virtual account numbers may be associated with the electronic wallet 204*a* based on the payer such that each payer may transfer funds to the electronic wallet 204*a* using different virtual account numbers, and the electronic wallet 204*a* may be associated with a plurality of virtual account numbers (i.e., a different virtual account number for each payer that would like to transfer funds to that electronic wallet 204*a*.)

Thus, systems and methods for transferring funds to an electronic wallet have been described that allow a payer to transfer funds to a user's electronic wallet without involving any other financial account of that user. Specific embodiments of the systems and methods provide for the transfer of funds by a payer to an electronic wallet of a user via the Automated Clearing House (ACH) network for financial transactions by using an ACH routing number that is globally unique to the payment service provider that provides the electronic wallet, along with a virtual account number that is unique to electronic wallets provided by the payment service provider. Such systems and methods allow for the use of existing ACH network infrastructure to facilitate the fund transfer from the payer to the electronic wallet, and eliminate the need associated with conventional fund transfer systems to involve financial accounts belonging to the user, or the cashing of physical checks at a user bank account.

Figure 4:
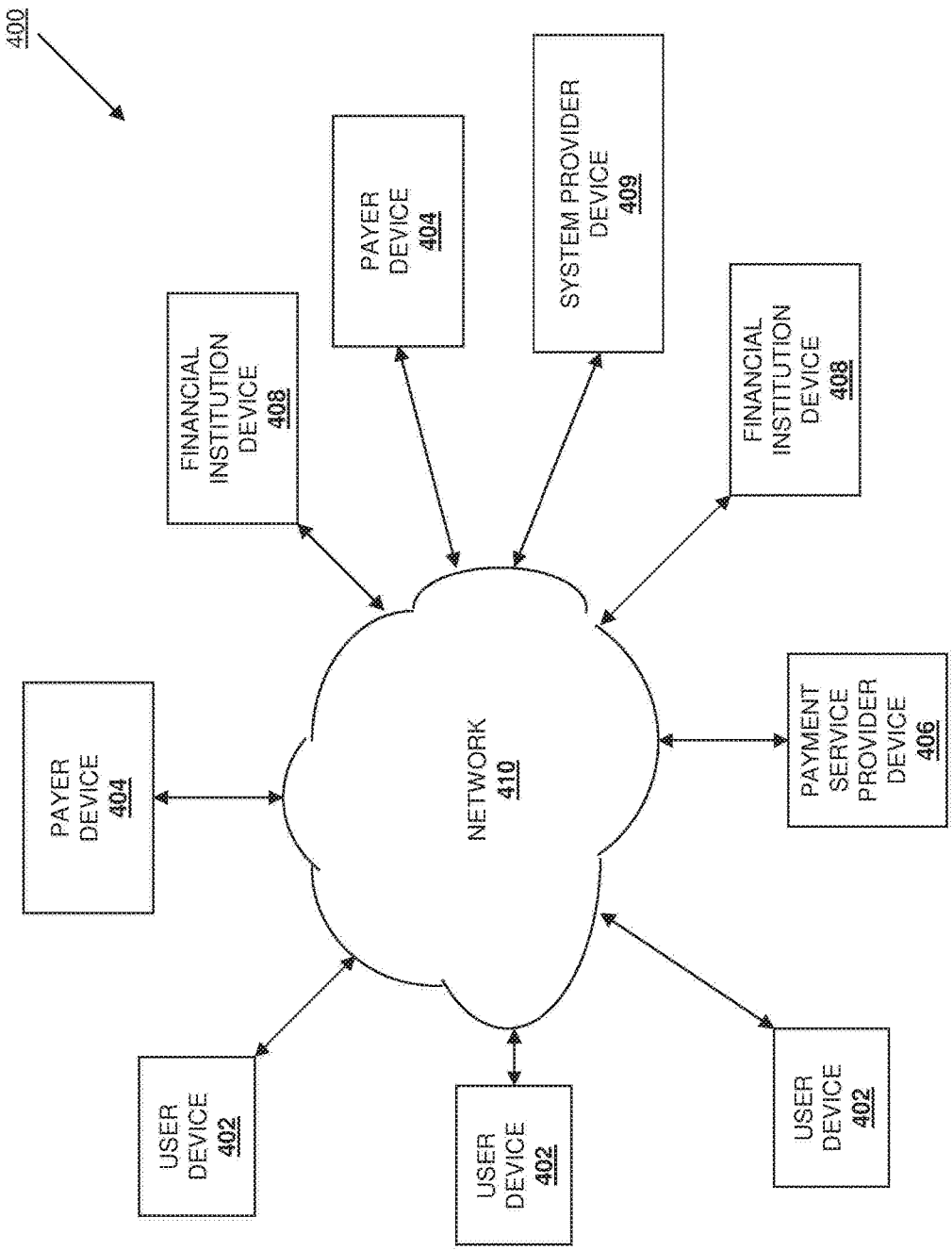
FIG. 4 is a schematic view illustrating an embodiment of a networked system.

Referring now to FIG. 4, an embodiment of a network-based system 400 for implementing one or more processes described herein is illustrated. As shown, network-based system 400 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 4 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 400 illustrated in FIG. 4 includes a plurality of user devices 402, a plurality of payer devices 404, a payment service provider device 406, a plurality of financial institution devices 408, and/or a system provider device 409 in communication over a network 410. Any of the user devices 402 may be the user devices discussed above and may be operated by the users discussed above. The payer devices 404 may be any of the payer devices discussed above and may be operated by the payers discussed above. The payment service provider device 406 may be the payment service provider devices discussed above and may be operated by a payment service provider such as, for example, PayPal Inc. of San Jose, CA The financial institution devices 408 may be the financial institution devices discussed above and may be operated by the financial institution discussed above such as, for example, credit card account providers, bank account providers, savings account providers, and a variety of other financial institutions known in the art. The system provider device 409 may be any of the system provider devices discussed above and may be operated by the system provider discussed above.

The user devices 402, payer devices 404, payment service provider device 406, financial institution devices 408, and/or system provider device 409 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 400, and/or accessible over the network 410.

The network 410 may be implemented as a single network or a combination of multiple networks. For example, in various embodiments, the network 410 may include the Internet and/or one or more intranets, landline networks, wireless networks, and/or other appropriate types of networks.

The user devices 402 may be implemented using any appropriate combination of hardware and/or software configured for wired and/or wireless communication over network 410. For example, in one embodiment, the user devices 402 may be implemented as a personal computer of a user in communication with the Internet. In other embodiments, the user devices 402 may be a smart phone, personal digital assistant (PDA), laptop computer, and/or other types of computing devices.

The user devices 402 may include one or more browser applications which may be used, for example, to provide a convenient interface to permit the payer to browse information available over the network 410. For example, in one embodiment, the browser application may be implemented as a web browser configured to view information available over the Internet.

The user devices 402 may also include one or more toolbar applications which may be used, for example, to provide user-side processing for performing desired tasks in response to operations selected by the user. In one embodiment, the toolbar application may display a user interface in connection with the browser application.

The user devices 402 may further include other applications as may be desired in particular embodiments to provide desired features to the user devices 402. In particular, the other applications may include a payment application for payments assisted by a payment service provider through the payment service provider device 406. The other applications may also include security applications for implementing user-side security features, programmatic user applications for interfacing with appropriate application programming interfaces (APIs) over the network 410, or other types of applications. Email and/or text applications may also be included, which allow the user to send and receive emails and/or text messages through the network 410. The user devices 402 include one or more user and/or device identifiers which may be implemented, for example, as operating system registry entries, cookies associated with the browser application, identifiers associated with hardware of the user devices 402, or other appropriate identifiers, such as a phone number. In one embodiment, the user identifier may be used by the payment service provider device 406 and/or payer devices 404 to associate the user with a particular account as further described herein.

Figure 5:
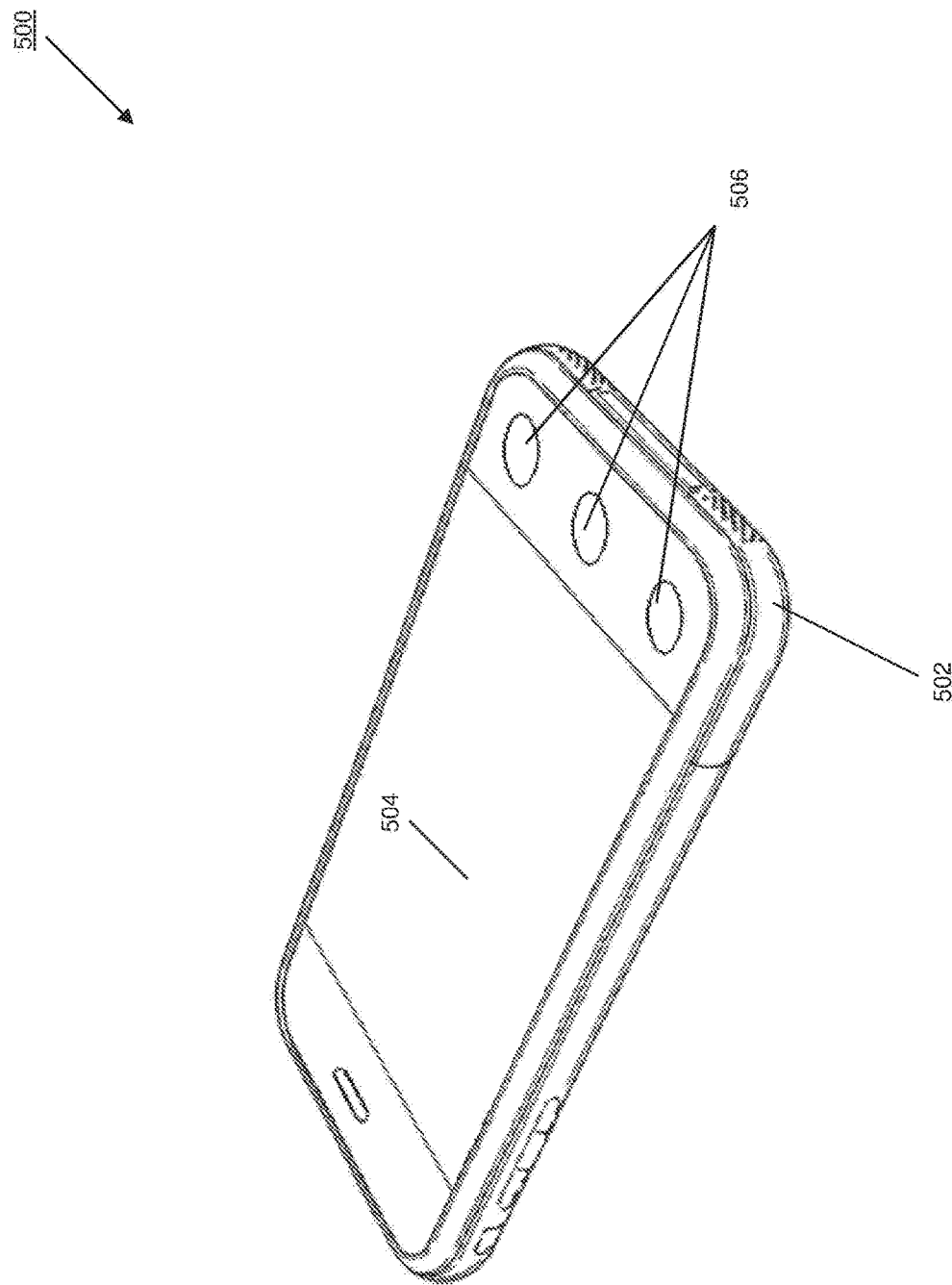
FIG. 5 is a perspective view illustrating an embodiment of a payer device.

Referring now to FIG. 5, an embodiment of a user device 500 is illustrated. The user device 500 may be any of the user devices discussed above. The user device 500 includes a chassis 502 having a display 504 and an input device including the display 504 and a plurality of input buttons 506. One of skill in the art will recognize that the user device 500 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 6:
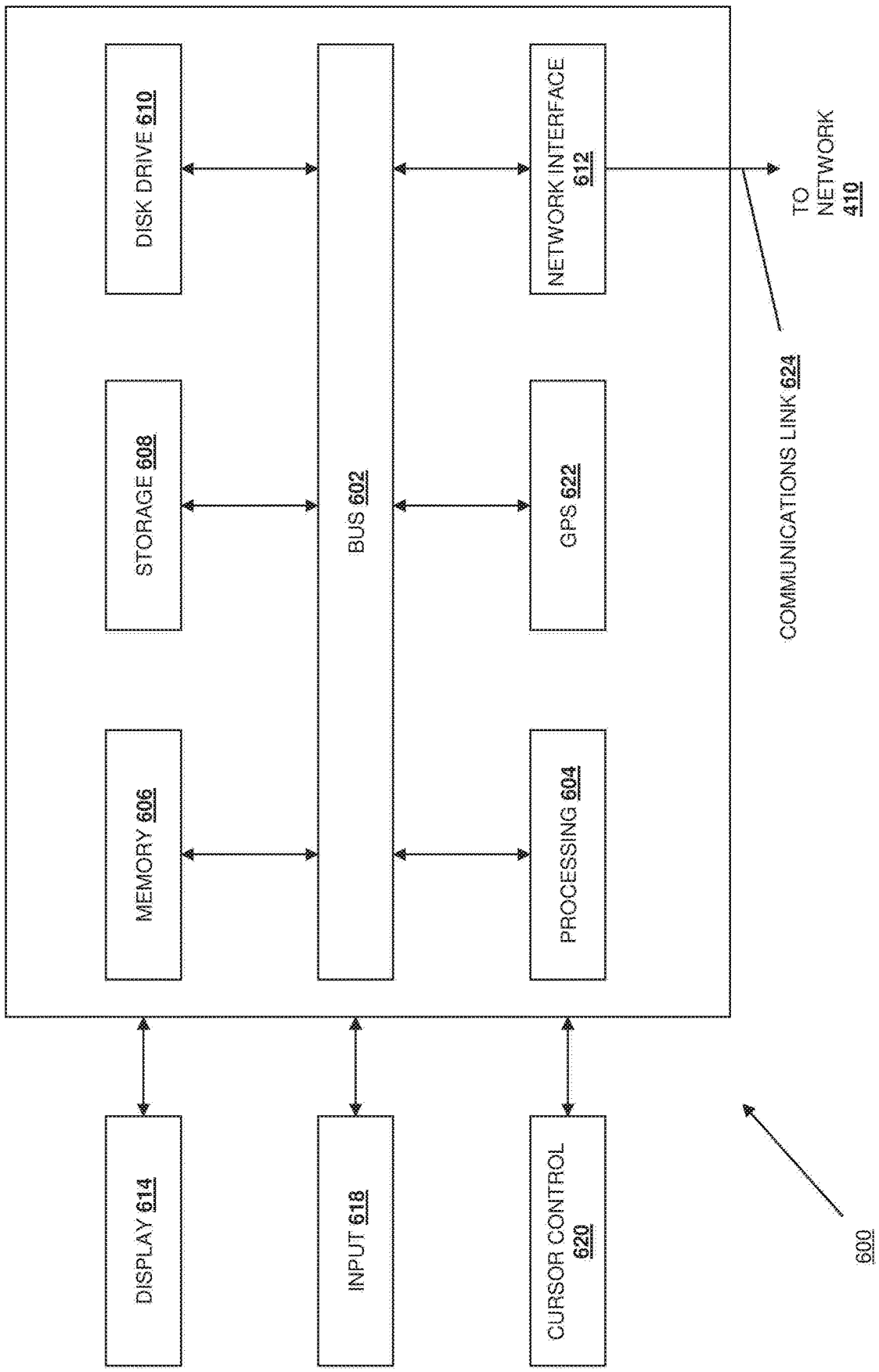
FIG. 6 is a schematic view illustrating an embodiment of a computer system.

Referring now to FIG. 6, an embodiment of a computer system 600 suitable for implementing, for example, the user devices, the payer devices, the payment service provider device, the financial institution devices, and/or the system provider device, is illustrated. It should be appreciated that other devices utilized by users, payers, payment service providers, account providers, and/or system providers in the electronic wallet fund transfer system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), and/or a location determination component 622 (e.g., a Global Positioning System (GPS) device as illustrated, a cell tower triangulation device, and/or a variety of other location determination devices known in the art.) In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the user devices, the payer devices, the payment service provider device, the financial institution devices, and/or the system provider device. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 600. In various other embodiments of the present disclosure, a plurality of the computer systems 600 coupled by a communication link 624 to the network 410 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Figure 7:
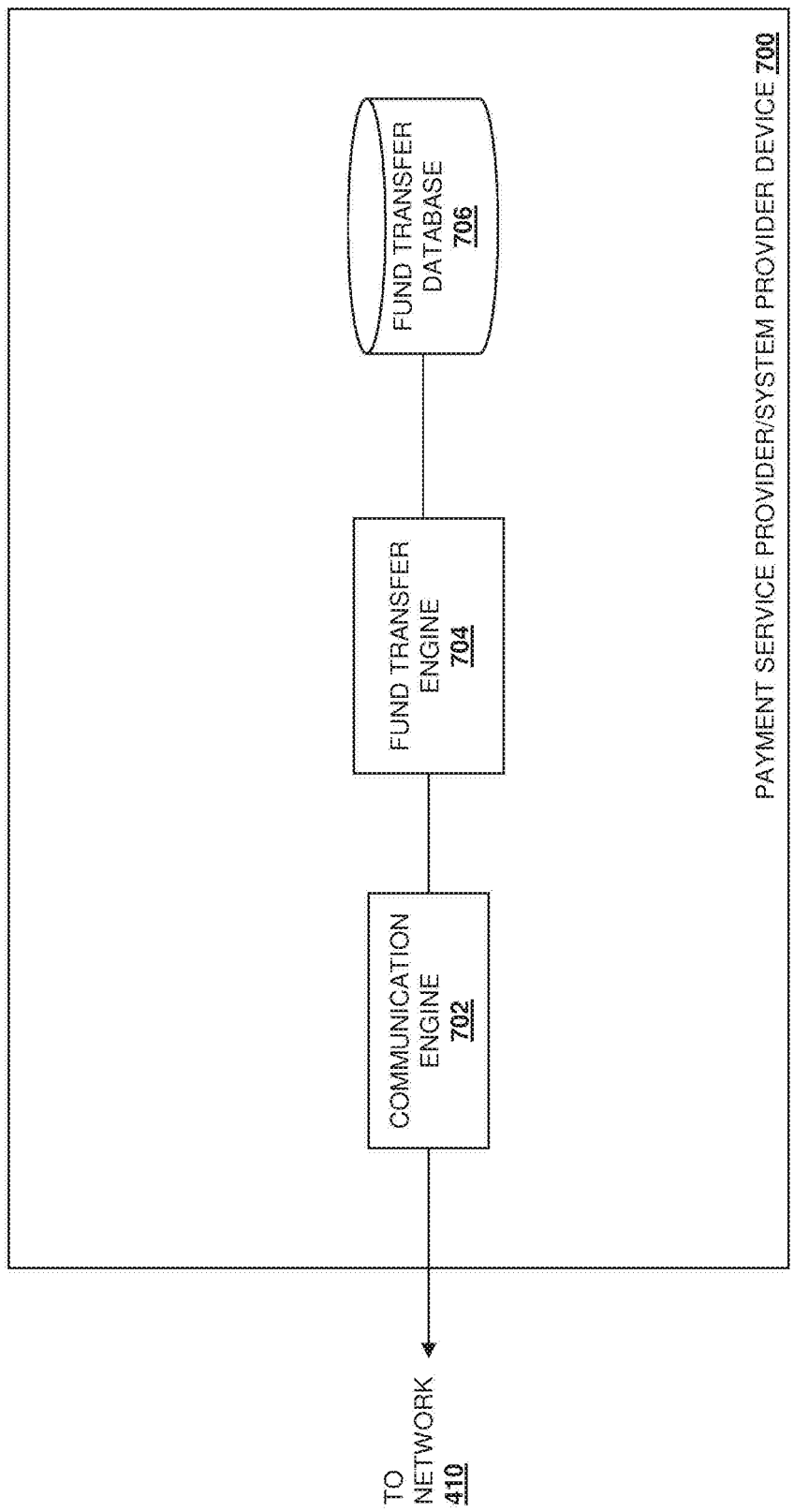
FIG. 7 is a schematic view illustrating an embodiment of a system provider device.

Referring now to FIGS. 7, an embodiment of a payment service provider device/system provider device 700 is illustrated. In an embodiment, the device 700 may be the payment service provider device and/or the system provider device discussed above. The device 700 includes a communication engine 702 that is coupled to the network 410 and to fund transfer engine 704 that is coupled to a fund transfer database 706. The communication engine 702 may be software or instructions stored on a computer-readable medium that allows the device 700 to send and receive information over the network 410. The fund transfer engine 704 may be software or instructions stored on a computer-readable medium that is operable to receive requests for fund transfer information, generate virtual account numbers, associate virtual account numbers with electronic wallets in the fund transfer database 706, disassociate virtual account numbers and electronic wallets in the fund transfer database 706, provide authentication credential screens, receive authentication credentials, provide fund transfer information, receive information about a fund transfer to a payment service provider/system provider account, allocate funding amounts to electronic wallets, and provide any of the other functionality that is discussed above. While the database 706 has been illustrated as a single database that is located in the device 700, one of skill in the art will recognize that the database 706 may be multiple databases and/or may be connected to the fund transfer engine 704 through the network 410 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and payers; however, a payer can pay, or otherwise interact with any type of recipient, including charities and individuals. The payment does not have to involve a fund transfer, but may be a loan, a charitable contribution, a gift, etc. Thus, user as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An electronic wallet funds transfer system associated with a payment service provider, the electronic wallet funds transfer system comprising:
    a non-transitory memory; and
    one or more hardware processing components coupled to the non-transitory memory and configured to read instructions from the non-transitory memory to cause the electronic wallet funds transfer system to perform operations comprising:
        receiving, from a payer device associated with a payer, a request to transfer funds from a payer account to an electronic wallet of a payee administered by the payment service provider, wherein the electronic wallet is not linked to a payee account at a banking institution;
        generating a virtual account number for the request and associating the virtual account number with the electronic wallet;
        providing, to the payer device, first information usable to initiate a funds transfer, the first information comprising a routing number unique to the payment service provider and the virtual account number associated with the electronic wallet;
        receiving second information associated with the funds transfer, the second information indicating that funds associated with the funds transfer have been transferred to a financial account of the payment service provider, the second information comprising a funding amount and the virtual account number;
        after receiving the second information, determining that the funds transfer is associated with the electronic wallet based on a stored association between the virtual account number and the electronic wallet;
        allocating the funding amount indicated in the second information to the electronic wallet while the funds remain in the financial account of the payment service provider; and
        in response to allocating the funding amount to the electronic wallet, disassociating the virtual account number from the electronic wallet.

2. The electronic wallet funds transfer system of claim 1, wherein the second information associated with the funds transfer is received from a financial institution device.

3. The electronic wallet funds transfer system of claim 2, wherein the second information associated with the funds transfer is passed from the payer device to the financial institution device.

4. The electronic wallet funds transfer system of claim 1, wherein the virtual account number associated with the electronic wallet is unique to the electronic wallet within the payment service provider.

5. The electronic wallet funds transfer system of claim 1, wherein the allocating the funding amount to the electronic wallet enables a user of the electronic wallet to access the funds.

6. The electronic wallet funds transfer system of claim 1, wherein the funds transfer is performed via an Automated Clearing House (ACH) network.

7. The electronic wallet funds transfer system of claim 6, wherein the routing number is unique to the payment service provider within the ACH network.

8. A computer-implemented method, comprising:
    receiving, from a payer device associated with a payer, a request to transfer funds from a payer account to an electronic wallet of a payee administered by a payment service provider, wherein the electronic wallet is not linked to a payee account at a banking institution;
    generating a virtual account number for the request and linking the virtual account number to the electronic wallet;
    providing, to the payer device, first information usable to initiate a funds transfer, the first information comprising a routing number unique to the payment service provider and the virtual account number that is linked to the electronic wallet;
    receiving, from a financial institution device, second information associated with the funds transfer, the second information indicating that funds associated with the funds transfer have been transferred to a financial account of the payment service provider, the second information comprising a funding amount and the virtual account number;
    determining that the funds transfer is associated with the electronic wallet based on a stored association between the virtual account number and the electronic wallet;
    allocating the funding amount indicated in the second information to the electronic wallet while the funds remain in the financial account of the payment service provider; and
    subsequent to allocating the funding amount to the electronic wallet, unlinking the virtual account number from the electronic wallet.

9. The computer-implemented method of claim 8, wherein the virtual account number is passed from the payer device to the financial institution device.

10. The computer-implemented method of claim 8, wherein the virtual account number is unique to the electronic wallet within the payment service provider.

11. The computer-implemented method of claim 8, wherein the second information associated with the funds transfer is received from the financial institution device.

12. The computer-implemented method of claim 8, wherein the allocating the funding amount to the electronic wallet enables a user of the electronic wallet to access the funds.

13. The computer-implemented method of claim 8, wherein the funds transfer is performed via an Automated Clearing House (ACH) network.

14. The computer-implemented method of claim 13, wherein the routing number is unique to the payment service provider within the ACH network.

15. A non-transitory machine-readable medium having stored thereon machine-readable instructions executable to cause a machine processor to perform operations comprising:
   receiving, from a payer device associated with a payer, a request to transfer funds from a payer account to an electronic wallet of a payee administered by a payment service provider, wherein the electronic wallet is not linked to a payee account at a banking institution;
   generating a virtual account number for the request and associating the virtual account number with the electronic wallet;
   providing, to the payer device, first information usable to initiate a funds transfer, the first information comprising a routing number unique to the payment service provider and the virtual account number associated with the electronic wallet;
   receiving, from a financial institution device, second information associated with the funds transfer, the second information indicating that funds associated with the funds transfer have been transferred to a financial account of the payment service provider, the second information comprising a funding amount and the virtual account number;
   determining that the funds transfer is associated with the electronic wallet based on a stored association between the virtual account number and the electronic wallet;
   allocating the funding amount indicated in the second information to the electronic wallet while the funds remain in the financial account of the payment service provider; and
   in response to allocating the funding amount to the electronic wallet, disassociating the virtual account number from the electronic wallet.

16. The non-transitory machine-readable medium of claim 15, wherein the virtual account number is passed from the payer device to the financial institution device.

17. The non-transitory machine-readable medium of claim 15, wherein the virtual account number is unique to the electronic wallet within the payment service provider.

18. The non-transitory machine-readable medium of claim 15, wherein the allocating the funding amount to the electronic wallet enables a user of the electronic wallet to access the funds.

19. The non-transitory machine-readable medium of claim 15, wherein the funds transfer is performed via an Automated Clearing House (ACH) network.

20. The non-transitory machine-readable medium of claim 19, wherein the routing number is unique to the payment service provider within the ACH network.

* * * * *